United States Patent Office 3,336,238
Patented Aug. 15, 1967

3,336,238
REGENERATION OF DEACTIVATED
HYDROREFINING CATALYST
John C. Gatsis, Des Plaines, Ill., assignor to Universal Oil Products Company, Des Plaines, Ill., a corporation of Delaware
No Drawing. Filed Sept. 7, 1965, Ser. No. 485,572
6 Claims. (Cl. 252—411)

The present application is a continuation-in-part of my copending application Ser. No. 303,177, filed Aug. 19, 1963, now abandoned, all the teachings of which copending application are incorporated herein by specific reference thereto.

In a broad embodiment, the present invention relates to a method for effecting the regeneration of various catalytic composites comprising one or more catalytically active metallic components. More specifically, the present invention is directed toward a method for effecting the regeneration of a catalytic composite which has become deactivated through the deposition thereupon of high molecular weight hydrocarbonaceous material, including gummy polymerization and copolymerization products. Catalytic composites to which the present invention is adaptable, and the regeneration of which are most advantageously effected through its use, are those composites comprising a suitable carrier material and one or more metallic components selected from the group consisting of the metals of Group VI–B and VIII of the Periodic Table, and compounds thereof, and which do not contain halogen as a catalytic component.

Catalytic composites, comprising one or more of the aforesaid metallic components, are extensively employed in processes for the hydrorefining of hydrocarbon mixtures, and the hydrocracking of high-boiling hydrocarbons into lower-boiling products. The hydrorefining of hydrocarbon fractions and/or distillates is effected for the primary purpose of removing a variety of contaminating influences having the tendency to effect the efficiency of processes to which the hydrocarbon mixture may be subsequently subjected. Such contaminating influences include sulfurous and nitrogenous compounds, organo-metallic compounds such as metal porphyrins and, particularly in high-boiling hydrocarbon mixtures, pentane-insoluble asphaltenes. These contaminants are found in virtually all untreated hydrocarbon mixtures, regardless of the precise boiling range thereof, with the degree of contamination generally increasing as the end boiling point of the hydrocarbon mixture increases. Thus, although a kerosene boiling fraction may be highly contaminated through the presence of excessive quantities of sulfurous and nitrogenous compounds, as well as some organo-metallic compounds, a petroleum crude oil or crude tower bottoms fraction which boils substantially totally above about 650° F., and having an end boiling point as high as about 1000° F., is generally contaminated to a greater extent. Thus, a Wyoming sour crude, having a gravity, ° API @ 60° F., of 23.2, contains about 2.8% by weight of sulfur, 2700 p.p.m. of total nitrogen, 100 p.p.m. of metal porphyrins (as elemental nickel and vanadium) and consists of about 8.39% by weight of pentane-insoluble asphaltenes. A crude tower bottoms product, having a gravity, ° API @ 60° F., of 14.3 and contaminated by the presence of 3.08% by weight of sulfur, 3830 p.p.m. of total nitrogen, 85 p.p.m. of metals, consists of 10.93% by weight of pentane-insoluble asphaltenes.

Other hydrocarbon fractions and/or distillates, which are generally subjected to processes for hydrorefining and/or hydrocracking, include straight-run and catalytically-cracked naphtha fractions, kerosene fractions, light and heavy gas oils, vacuum gas oils, white oil stocks, black oil stocks, various cycle stocks, etc. In addition to the foregoing-described contaminating influences, the majority of the hydrocarbon fractions contain excessive quantities of unsaturated compounds consisting primarily of mono- and di-olefinic hydrocarbons. At the operating conditions generally employed to effect successful hydrorefining and/or hydrocracking, the mono- and di-olefinic hydrocarbons have the tendency to polymerize and co-polymerize thereby causing the deposition of high molecular weight, gummy polymerization products within the process equipment and onto the catalytic composite employed. Similarly, in processes for effecting the hydrocracking of heavier hydrocarbon fractions into lower-boiling hydrocarbon products, the catalytic composite becomes deactivated through carbonization effected as a result of the deposition of pentane-insoluble asphaltenes as well as other heavy hydrocarbonaceous material, whereby the catalytically active centers and surfaces are effectively shielded from the material being processed.

The object of the present invention is to provide a method for effecting the regeneration of a deactivated, carbonized catalytic composite which has been employed in processes such as the hydrogenation, hydrorefining and/or hydrocracking of hydrocarbon fractions or distillates. Therefore, in a broad embodiment, the present invention relates to a method for regenerating a deactivated, carbonized catalytic composite, which method comprises hydrogenating said composite with hydrogen and an iodine-containing compound at hydrogenation conditions.

Another broad embodiment of the present invention involves a method for regenerating a deactivated catalytic composite containing at least one metallic component selected from the group consisting of the metals of Groups VI–B and VIII of the Periodic Table, which method comprises hydrogenating said composite with hydrogen and iodine at hydrogenating conditions.

A more specific embodiment of the present invention affords a method for regenerating a deactivated, carbonized catalytic composite containing at least one metallic component from the metals of Group VI–B and the Iron-group of the Periodic Table, and substantially free from halogen as a catalytic component, which method comprises hydrogenating said composite with hydrogen and iodine at hydrogenation conditions of a temperature of from about 300° C. to about 500° C. and a pressure within the range of from about 1000 to about 5000 lbs. per square inch gauge.

From the foregoing embodiments, it is noted that the regeneration method of the present invention consists of hydrogenating the deactivated catalytic composite with an iodine-containing compound. The use of the term "iodine-containing compound" is intended to include, for example, hydrogen iodide, iodoform, gaseous iodine, and metal iodides selected from the group consisting of metals of Group II of the Periodic Table, the latter including zinc iodide, cadmium iodide, beryllium iodide, magnesium iodide, calcium iodide, mixtures of two or more, etc. In many instances, acceptable regenerative results are obtained through the use of metal iodides from Group III of the Periodic Table, for example aluminum iodide, boron iodide, gallium iodide, etc. The metallic iodides can also be utilized in combination with the foregoing iodine compounds, the latter being particularly preferred; for example, the deactivated catalyst can be hydrogenated in the presence of iodoform and zinc iodide, hydrogen iodide and magnesium iodide, iodoform and iodine, etc. The iodine-containing compound is utilized in an amount within the range of from about 0.5% to about 5.0% by weight, calculated as elemental iodine and based upon the weight of the catalytic composite intended to be regenerated.

In either a hydrorefining process, or a hydrocracking process, the hydrocarbon charge stock and hydrogen are admixed prior to entering the reaction zone at reaction conditions. The total product effluent from the reaction zone is passed into a high-pressure separator from which a hydrogen-rich recycle gas is withdrawn by compressive means, and subsequently recycled to combine with fresh hydrocarbon charge. The recycle gas is generally treated to remove ammonia, hydrogen sulfide, light gaseous hydrocarbons, etc., in order to increase the concentration of hydrogen. When the catalytic composite becomes deactivated to the extent that the desired operation is no longer feasible, the hydrocarbon charge stock is cut out of the system, but the flow of hydrogen-rich recycle gas is continued. Following the removal of residual liquid and gaseous hydrocarbons, being stripped from the catalyst by the continued flow of hydrogen, the gaseous iodine-containing compound, for example iodoform, may be admixed with the recycle gas, the mixture being passed into the reaction zone under hydrogenation conditions of a temperature within the range of about 300° C. to about 500° C. and a pressure of from about 1000 to about 5000 p.s.i.g. When the metallic iodides, selected from the metals of Group II of the Periodic Table, are utilized as the regenerating medium, the same may be dissolved in a suitable solvent, for example, a pre-hydrogenated hydrocarbon fraction, such as a kerosene or light gas oil, the solution being admixed with the recycle gas prior to being introduced into the reaction zone. Analysis of the liquid product effluent being removed from the high-pressure separator will indicate the degree of reactivation being effected and will further indicate when the regeneration is substantially complete. Those instances where iodoform, iodine, hydrogen iodide, etc. are utilized as the reactivation medium, the regeneration of the catalyst may be considered complete when liquid hydrocarbons no longer appear in the high-pressure separator. To facilitate the reactivation procedure, a pre-hydrogenated kerosene or light gas oil may be utilized in combination with iodoform, hydrogen iodide and/or iodine, etc.

As hereinbefore set forth the present invention is particularly adaptable to the reactivation, or regeneration, of catalytic composites which have been utilized in the hydrorefining and/or hydrocracking process. In the present specification and appended claims, the term "metallic component" or "catalytically active metallic component" is intended to encompass those catalytic components which are employed for hydrogenation, hydrorefining and/or hydrocracking activity. In this manner, the catalytically active metallic components are distinguished from those components which are employed as the carrier material, whether inert or possessing a desired degree of hydrocracking activity. For the purposes of the present invention, the precise means utilized in the preparation of the catalytic composite is not considered to be a limiting feature. Thus, a catalyst may comprise a carrier material including various aluminum silicates, various alumina-containing clays, sands, ores, earths and the like, or synthetically-prepared refractory inorganic oxides such as silica, alumina, zirconia, magnesia, titania, strontia, boria, hafnia, mixtures of two or more, etc.

When describing the catalytically active metallic components, to which the regeneration method of the present invention is applicable, reference is made to the Periodic Chart of The Elements published by Fisher Scientific Co., 1953. The metallic components are those which are selected from the group of metals of Groups VI–B and VIII of the Periodic Table, and are distinguished from those catalytic components employed as the solid support, or carrier material. The metallic component of the catalyst to be regenerated by the present invention may comprise mixtures of two or more of such metals, and such metals may exist in the elemental state, or in some combined form such as oxides, sulfides, etc. Thus, the catalytic composite to be regenerated in accordance with the method of the present invention may comprise chromium, molybdenum, tungsten, iron, cobalt, nickel, palladium, platinum, ruthenium, rhodium, osmium, iridium, and mixtures of two or more including nickel-chromium, molybdenum-platinum, molybdenum-palladium, chromium-platinum, chromium-palladium, molybdenum-nickel-palladium, etc.

Although the precise composition of the catlytic composite, to be reactivated in accordance with the present invention, is not essential, the method is more advantageously applied to those composites which have been prepared substantially free of halogen as a catalytic component. That is to say, where the catalyst is initially prepared to contain chlorine and/or fluorine, generally combined with other components, and which serve as an active, integral catalytic component, reactivation of such catalyst requires a reconditioning procedure to recombine such chlorine and/or fluorine before the catalyst can be successfully regenerated for its intended purpose. Such is not the case with the iodide-regeneration method of the present invention, since no iodine is retained on the catalyst for the purpose of serving as an active component thereof.

The total catalytically active metallic components will be present in amounts within the range of from about 1.0% to about 30.0% by weight, calculated as the elements thereof. The Group VI–B metal, such as chromium, molybdenum or tungsten, will be present in an amount of from about 1.0% to about 20.0% by weight, while the Group VIII metals will be present in an amount of from about 0.1% to about 10.0% by weight. Lesser quantities of the Platinum-group metals are generally utilized than the Iron-group metals, and the former will be present in an amount from about 1.0% to 5.0% by weight, while the latter in an amount from about 1.0% to 10.0% by weight.

The following examples are presented for the purpose of illustrating the method by which the present invention is utilized to regenerate, or reactivate a catalytic composite which has been deactivated through the deposition of high molecular weight polymerization and copolymerization products, as well as carbonization through the deposition of heavy hydrocarbonaceous residue. It is not intended that the present invention be unduly limited to the reaction conditions, concentrations, and/or reagents employed for the sole purpose of illustration.

The charge stock utilized in the following examples is a Wyoming sour crude oil having a gravity ° API @ 60° F., of about 23.2, and contained about 2700 p.p.m. of total nitrogen, approximately 2.8% by weight of sulfur (calculated as the element), 100 p.p.m. of total metals (nickel and vanadium porphyrins), and about 8.39% by weight of pentane-insoluble asphaltenes. The catalyst is prepared by initially forming an alumina-silica carrier material having an apparent bulk density of 0.28 gram per cc., and containing about 37% by weight of silica. Sufficient nickel nitrate hexahydrate and molybdic acid (85.0% by weight of molybdenum oxide) is utilized in an impregnating technique to result in a final catalyst containing 1.5% by weight of nickel and 16.0% by weight of molybdenum, calculated as the elements thereof. The catalyst is dried at a temperature of 250° F. for a period of about 12 hours and thereafter subjected to oxidation for a period of about one hour, in an atmosphere of air maintained at a temperature of about 1100° F.

*Example 1*

The charge stock is admixed with a hydrogen-rich recycle gas stream in an amount of about 8000 s.c.f./bbl., the mixture being passed into a reaction zone maintained at a pressure of about 1500 p.s.i.g., the inlet temperature to the catalyst therein being held at a temperature of about 900° F. The total product effluent is passed into a high-pressure separator from which a hydrogen-rich gas stream is removed, admixed with make-up hydrogen to compensate for that consumed within the reaction zone, and subsequently admixed with additional hydrocarbon charge. The normally liquid product effluent removed from the high-pressure separator, upon analysis, indicates a nitrogen concentration less than about 10 p.p.m., about 0.02% by weight of sulfur, about 0.3% by weight of pentane-insoluble asphaltenes and less than about 0.10 p.p.m. of total metals.

*Example II*

When the normally liquid product effluent indicates a total metals content in excess of about 0.50 p.p.m., or in excess of about 0.7% by weight of pentane-insoluble hydrocarbons, the catalyst is deactivated to the extent that the regeneration thereof becomes economically feasible. The liquid hydrocarbon charge stock is cut out of the unit, the flow of hydrogen-rich recycle gas being continued until such time as there is no indication that additional hydrocarbons are being stripped from the catalytic composite disposed within the reaction zone. Iodoform, in an amount sufficient to be equivalent of about 1.0% by weight of iodine, based upon the weight of the catalytic composite disposed within the reaction zone, is admixed with the hydrogen-rich recycle gas stream, the mixture passing through the catalyst at a pressure of about 2000 p.s.i.g., the catalyst being maintained at a temperature of about 450° C.

The liquid product effluent resulting from the hydrogenation of the deactivated catalyst, collected within the high-pressure separator, is removed therefrom and combined with fresh hydrocarbon charge. When there is no further indication that the regeneration media is producing normally liquid hydrocarbons, the hydrocarbon charge stock is reintroduced into the system. In the particular hydrorefining operation above described, there is produced a significant quantity of hydrogen sulfide and ammonia. The greater portion of this material appears in the gaseous phase from the high-pressure separator, and is generally removed from the hydrogen-rich gas stream by any suitable, well-known means. Similarly, the iodoform, or other material producing gaseous iodine, is likewise readily removed from the recycle gas stream during the processing of the hydrocarbon charge stock. Analysis of the normally liquid product effluent, following the regeneration of the catalytic composite, indicates results comparable to those obtained prior to subjecting the catalyst to regeneration.

The foregoing specification and examples illustrate the advantages afforded the hydrorefining and/or hydrocracking of petroleum crude oils through the utilization of a particular method for the regeneration of the catalytic composite employed. Of interest is the fact that the method of the present invention is readily adaptable to a multiple-stage process wherein one or more reaction zones is on-stream while one or more reaction zones is being subjected to regeneration.

I claim as my invention:

1. A method for regenerating a deactivated catalytic composite comprising an Iron-group metal or compound thereof supported on a solid carrier and substantially free of halogen as a catalytic component, said composite having become contaminated by a solid hydrocrabonaceous material deposited thereon during the utilization of said composite for the hydrorefining or hydrocracking of a hydrocarbon charge stock by contacting the composite with said charge stock in admixture with hydrogen, which regeneration method comprises:

(a) discontinuing the contacting of said composite with said charge stock;
(b) contacting the composite with a stream of hydrogen-containing gas to strip residual liquid hydrocarbons therefrom;
(c) contacting the resulting stripped composite with a stream of hydrogen in admixture with an iodine-containing compound at a temperature of about 300° C. to about 500° C. and a pressure of about 1,000 to about 5000 p.s.i.g., thereby converting said solid hydrocarbonaceous material to a normally liquid hydrocarbon and stripping said normally liquid hydrocarbon from said composite; and
(d) continuing step (c) at least until the production of such normally liquid hydrocarbon ceases.

2. A method for regenerating a deactivated catalytic composite comprising an Iron-group metal or compound thereof and a Group VI-B metal or compound thereof supported on a solid carrier and substantially free of halogen as a catalytic component, said composite having become contaminated by a solid hydrocarbonaceous material deposited thereon during the utilization of said composite for the hydrorefining or hydrocracking of a hydrocarbon charge stock by contacting the composite with said charge stock in admixture with hydrogen, which regeneration method comprises:

(a) discontinuing the contacting of said composite with said charge stock;
(b) contacting the composite with a stream of hydrogen-containing gas to strip residual liquid hydrocarbons therefrom;
(c) contacting the resulting stripped composite with a stream of hydrogen in admixture with an iodine-containing compound at a temperature of about 300° C. to about 500° C. and a pressure of about 1000 to about 5000 p.s.i.g., thereby converting said solid hydrocarbonaceous material to a normally liquid hydrocarbon and stripping said normally liquid hydrocarbon from said composite; and
(d) continuing step (c) at least until the production of said normally liquid hydrocarbon ceases.

3. The method of claim 2 further characterized in that said catalytic composite consists essentially of molybdenum and nickel supported on a refractory inorganic oxide carrier.

4. The method of claim 1 further characterized in that said iodine-containing compound comprises a metal iodide selected from the group consisting of the metals of Group II of the Periodic Table.

5. The method of claim 1 further characterized in that said iodine-containing compound comprises iodoform.

6. The method of claim 1 further characterized in that said iodine-containing compound comprises hydrogen iodide.

References Cited

UNITED STATES PATENTS

| | | | |
|---|---|---|---|
| 2,246,900 | 6/1941 | Schulze et al. | 252—415 |
| 2,488,711 | 11/1949 | Forrester | 252—415 X |
| 2,867,579 | 1/1959 | Loughran et al. | 252—411 |
| 2,916,440 | 12/1959 | Hogin et al. | 252—411 |
| 3,048,536 | 8/1962 | Coonradt et al. | 208—110 |
| 3,132,091 | 5/1964 | Young | 252—411 |
| 3,249,556 | 4/1966 | Gatsis | 208—264 |

DANIEL E. WYMAN, *Primary Examiner.*

OSCAR R. VERTIZ, A. J. GREIF, L. G. XIARHOS,
*Assistant Examiners.*